May 20, 1958 P. BASHUK 2,835,781
ELECTRICAL STEAM SPRAYER
Filed March 21, 1957 3 Sheets-Sheet 1
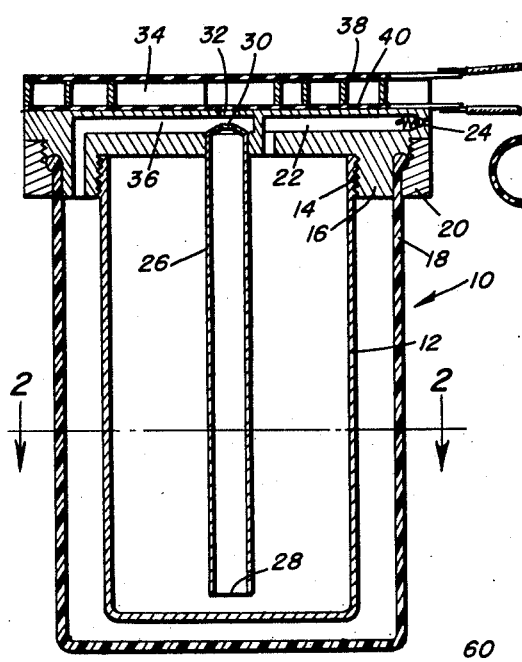
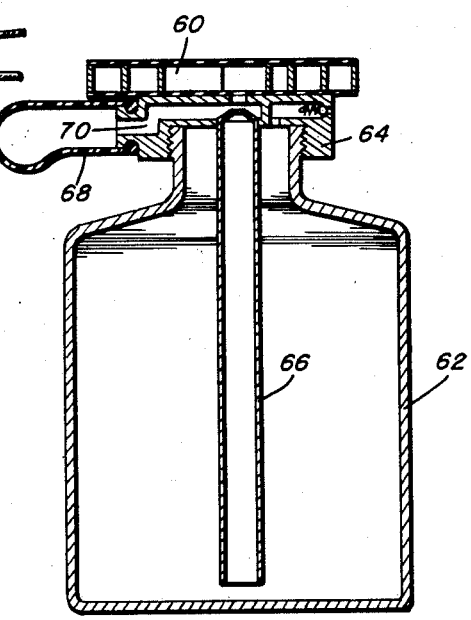
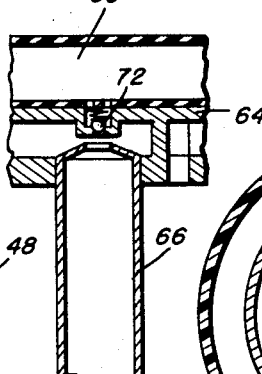
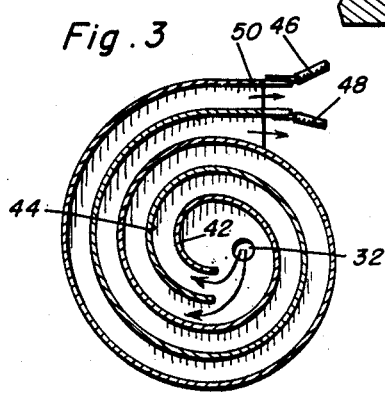
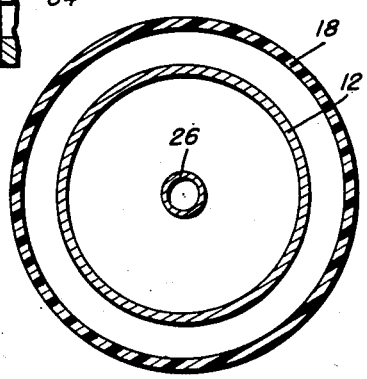
Peter Bashuk
INVENTOR.

May 20, 1958 P. BASHUK 2,835,781
ELECTRICAL STEAM SPRAYER
Filed March 21, 1957 3 Sheets-Sheet 2

Peter Bashuk
INVENTOR.

BY *Clarence A. O'Brien*
*and Harvey B. Jacobson*
Attorneys

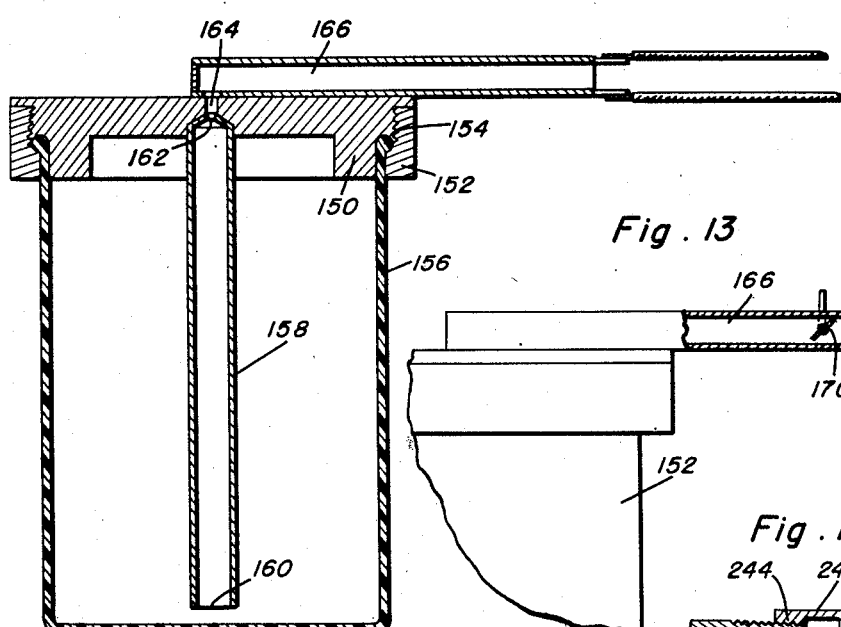
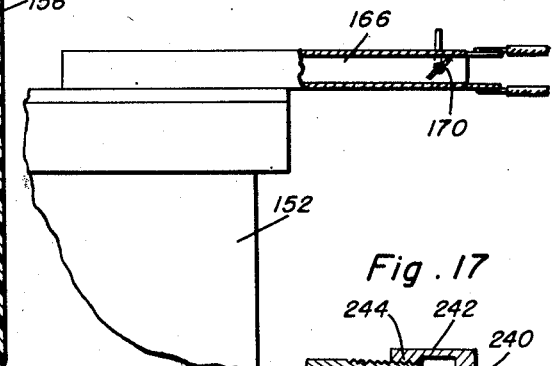
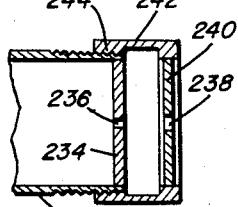
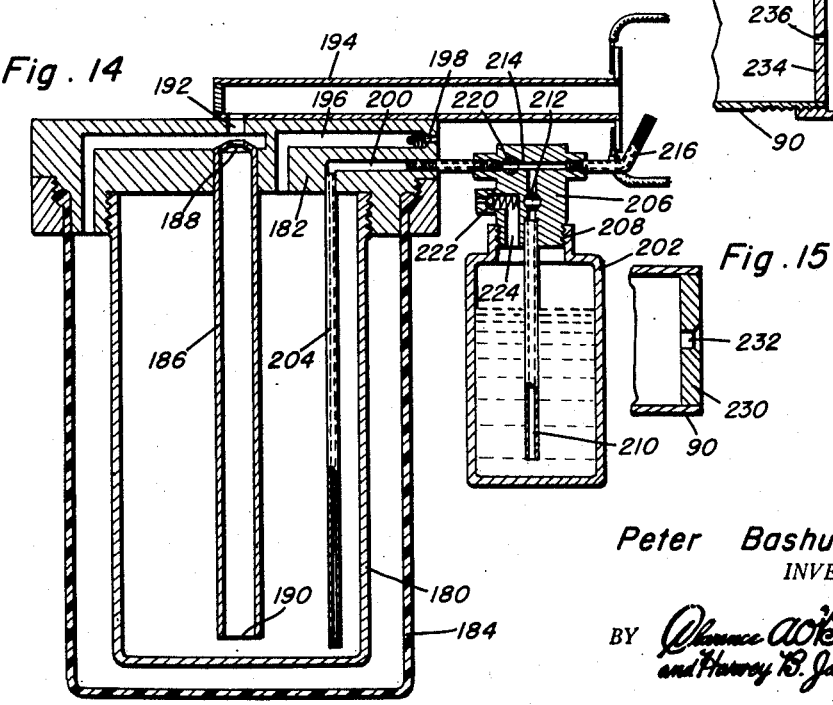

United States Patent Office 2,835,781
Patented May 20, 1958

2,835,781

ELECTRICAL STEAM SPRAYER

Peter Bashuk, Peabody, Mass.

Application March 21, 1957, Serial No. 647,618

6 Claims. (Cl. 219—39)

This invention relates to an electrical steam sprayer, and more particularly to a device for effectively heating fluid so that a dry steam may be readily sprayed for various purposes such as therapeutic treatments and the like.

The concept of this invention features the utilization of a novel heating unit which is not inserted into the fluid but is mounted on the cap whereby the steam is only supplied when desired even though current may be continuously supplied to the heating unit thereby assuring that a minimum of steam will be sprayed while being able to direct the steam in a desired path at a particular time.

A further object of the invention resides in the provision of a novel arrangement of parts whereby steam combined with a suitable medication can be easily sprayed.

Incorporated in the concept of the present invention is the utiliaztion of a novel flexible container or flexible blister pumper for causing water to be directed into a heating unit whereby it is changed into a suitable dry steam.

A further object of the present invention resides in the provision of a novel steam sprayer having knob means for controlling the amount of steam and for controlling the amount of moisture in the steam as may be desired.

Still further objects and features of this invention reside in the provision of an electric steam sprayer that is simple in construction, inexpensive to manufacture, and highly efficient in use.

These, together with the various ancillary objects and features of the invention which will become apparent as the following description proceeds, are attained by this electrical steam sprayer, preferred embodiments of which have been illustrated in the accompanying drawings, by way of example only, wherein:

Figure 1 is a longitudinal sectional detail view of one form of the invention employing a squeezable flexible outer container and a spirally coiled heating element;

Figure 2 is a horizontal sectional detail view as taken along the plane of line 2—2 of Figure 1;

Figure 3 is a sectional detail view illustrating particulars of construction of the heating unit employed in the invention;

Figure 4 is a sectional detail view of a modified form of the invention employing a flexible blister pumper;

Figure 12 is a sectional detail view of a modified form of the invention employing a single container which is made of a flexible material;

Figure 13 is a sectional detail view similar to that of Figure 12 and illustrating an arrangement of a valve incorporated in the invention;

Figure 14 is a sectional detail view illustrating a modified form of the invention for mixing steam with a medication or other fluid;

Figure 15 is a sectional detail view of a modified form of exhaust valve for controlling steam or fluid spray;

Figure 16 illustrates one form of check valve which may be utilized in conjunction with the invention; and Figure 17 is a sectional detail view of an alternate form of exhaust valve or nozzle.

Figure 5:
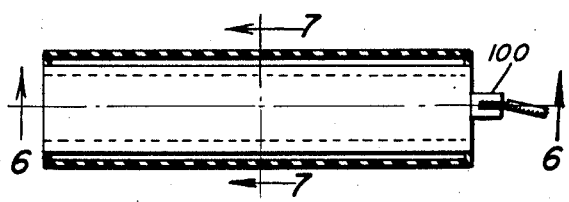
Figure 5 is a sectional detail view of one form of heating unit.

With continuing reference to the accompanying drawings wherein like reference numerals designate similar parts throughout the various views, and with initial attention directed to the embodiment of the invention as is shown in Figures 1 through 3, reference numeral 10 generally designates the electric steam sprayer according to the present invention. In this form of the invention there is provided a reservoir 12 formed of any suitable rigid material which is threadedly secured as at 14 to a special cap 16. This cap is adapted to retain a flexible outer container 18 utilizing a threaded cap element 20.

The cap 16 is connected to the atmosphere through an opening 22 controlled by a spring mounted check valve 24 of conventional construction. Carried by the cap 16 is a feed tube 26 which has an open lower end 28 and a jet-like upper opening 30 which communicates through passage 32 to a heating unit 34 of special construction. A check valve at the opening 30 may optionally be provided. Communicating with the space between the flexible outer container 16 and the reservoir 12 is a conduit 36. The heating unit 34 includes upper and lower plates 38 and 40 which in conjunction with spaced electrically conductive resistance elements 42 and 44 complete a spirally coiled heating unit. Conductors 46 and 48 are connected to the heating elements 42 and 44 and to a suitable source of electrical power for completing an operative electrical circuit through a water spray between the elements 42 and 44.

In operation, when the flexible outer container 18 is squeezed, fluid is ejected into the heating unit 34 where it is turned to steam and exhausted through the outlet end 50 of the heating unit. Of course, fluid in the reservoir 12 is replaced by air entering past the check valve 24 and through the opening 22 and any fluid not completely fed into the heating element 34 will be fed back into the outer container 18.

In Figure 4 there is shown a modified form of the invention employing a heating unit very similar to the heating unit 34 as indicated at 60 and employing only a rigid reservoir 62 as well as a cap 64. A feed tube 66 of similar construction to the tube 26 is mounted in the cap 64. However, in lieu of the outer container 18 there is provided a flexible blister pump 68 secured to the cap 64 and communicating with an opening 70 in the cap whereby when the flexible blister pump 68 is decompressed after being compressed it will cause fluid in the container 62 to be sucked up the tube 66 and into the heating element 60. As shown best in Figure 16, it is quite possible to provide a check valve as at 72 in the opening communicating the cap 64 with the element 60.

Figure 7:
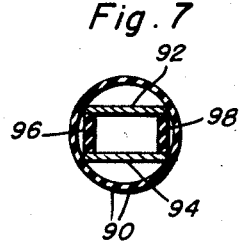
Figure 7 is a vertical sectional view as taken along the plane of line 7—7 in Figure 5.
Figure 6:
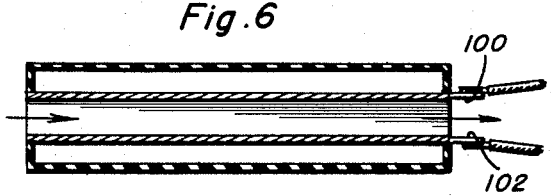
Figure 6 is a sectional detail view as taken along the plane of line 6—6 in Figure 5 further illustrating the heating unit.
Figure 9:
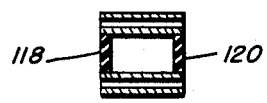
Figure 9 is a detail sectional view as taken along the plane of line 9—9 in Figure 8.

While the form of heating elements as shown in Figures 1 and 4 are spiral in shape, the heating elements may be formed of any convenient shape as may be desired. As shown in Figures 5 through 7, one form of heating element may be embedded in a cylinder of dielectric material as indicated at 90 and may include a pair of spaced resistance elements 92 and 94 interspaced by means of dielectric spacers 96 and 98. Terminals 100 and 102 may be provided for connection of conductors thereto which connect the heating element to a source of electrical power.

Figure 8:
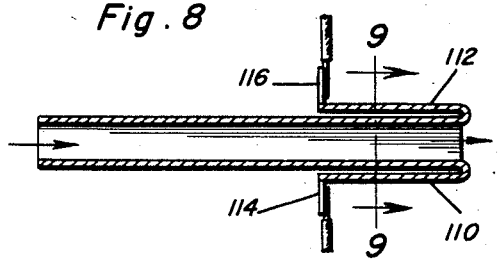
Figure 8 is a sectional detail view of a modified form of the invention.
Figure 10:
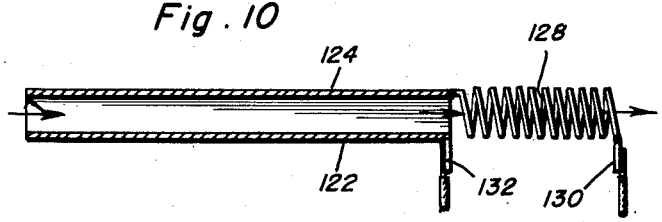
Figure 10 is a sectional detail view of a modified form of heating unit.

In the form of the invention as is shown in Figure 8, in order to reduce the size of the path of travel and to further heat the fluid, the heating elements 110 and 112 are bent back upon themselves at their ends to which terminals 114 and 116 are attached. Of course the heating elements 110 and 112 are interconnected by dielectric spacers 118 and 120. In Figure 10, there is shown an embodiment of the invention in which the spaced heating elements 124 and 126 are arranged so that a heating coil 128 is secured to the heating element 124 and has a terminal 130 while the heating element 122 has a terminal 132 to which the conductors are attached. The heating coil is electrically connected thus in series with the heating plate or element 124 and the housing, not shown, may enclose the heating coil 128 leading to a suitable nozzle.

Figure 11:
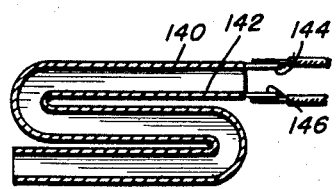
Figure 11 is a sectional detail view illustrating a further modification of heating unit.

In the form of the invention as is shown in Figure 11, the heating elements 140 and 142 are bent back upon themselves to form a compressed letter S or such other shape as desired and have the terminals 144 and 146 connected thereto for connecting of conductors leading to a source of electrical power.

Referring now to the forms of the invention as is shown in Figures 12 and 13, it will be noted that herein there is shown an arrangement of parts including a special cap 150 having a threaded cap element 152 threadedly secured as at 154 to the cap for holding a flexible container 156 in place. The special cap is used optionally in lieu of the simple threaded arrangement of Figure 4. Depending from the cap 150 is a feed tube 158 the feed tube having an open lower end 160 and a jet 162 at its upper end communicating through passageway 164 with a heating unit 166 which may be of any of the types heretofore described. In Figure 13, it is shown that the outlet end of the heating element 166 may be provided with a valve 170 controlled in any suitable manner for adequately controlling the amount of steam which may be discharged.

In Figure 14 there is shown a further modification in which the reservoir 180 which is threaded to the cap 182 has an outer flexible pumping container 184 very similar in construction to the outer container 18.

This form of the invention is also provided with a feed tube 186 having a jet 188 at its upper end and an intake 190 at its lower end the jet being in alignment with an opening 192 communicating with a heating element 194 which may be of any of the types heretofore described as may be desired. An opening 196 communicates the reservoir 180 with the atmosphere and may be controlled by a check valve 198. There is a suitable conduit 200 forming means connecting an auxiliary reservoir 202 with a siphon pipe 204 which is secured to a cap 206 threadedly secured as at 208 to the auxiliary reservoir 202. The auxiliary reservoir 202 has an auxiliary feed tube 210 communicating through a valve 212 to a passage 214 in the cap to which an exhaust conduit 216 is connected. Hence, when the valve 212 is opened, and the squeeze container 184 squeezed, fluid will be forced up the pipe 204 and out of the discharge 216 causing and drawing fluid from the auxiliary reservoir 202 to be drawn up and out of the discharge 216 much in the form of an atomizer. A valve 220 is provided for controlling flow through the passage 214 and there is provided a check valve 222 controlling the opening 224 communicating the reservoir 202 with the atmosphere.

The housings of the various heating elements may be provided with any suitable nozzle such as a disk 230 provided with the tapered opening 232. Alternatively, the disk 234 of the form shown in Figure 17 may be spaced from and having an opening 236 smaller than an opening 238 carried by disk 240 secured to a threaded cap 242 threadedly engaged as at 244 on a threaded end of the housing 90. Since the opening 238 is of a different size than the opening 236, the size of the jet of steam may be easily controlled. It is to be recognized that the sizes of these openings may be easily varied for special purposes. In addition, variations in the space between disk 234 and disk 240 permit the focusing of the jet stream. Further, by the arrangement of the valves provided for the atomizer of the auxiliary reservoir 202, various degrees of wetness of the fluid in the reservoir 202 can be obtained. Of course, this fluid can be suitable medicinal ingredients or the like when the device is used as a therapeutic appliance.

It is noted that a heating element unit along with the auxiliary reservoir, adaptable by suitable modifications, may be used as an attachment on the discharge end of conventional power or hand operated pump sprayers. These sprayers can pump water directly into heating element producing steam at the discharge end of heating element. This steam jet can siphon fluid from the separate auxiliary reservoir.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. An electrical steam sprayer comprising a reservoir, a feed tube having an open lower end extending into said reservoir, a cap on said reservoir, said feed tube being suspended from said cap, a heating unit secured to said cap, a passage in said cap communicating said tube with said heating unit, said heating unit having a steam delivery end, said heating unit comprising a pair of spaced electrical resistance elements, and means connecting said elements to a source of electrical current.

2. An electrical steam sprayer comprising a reservoir, a feed tube having an open lower end extending into said reservoir, a cap on said reservoir, said feed tube being suspended from said cap, a heating unit secured to said cap, a passage in said cap communicating said tube with said heating unit, said heating unit having a steam delivery end, said heating unit comprising a pair of spaced electrical resistance elements, and means connecting said elements to a source of electrical current, said resistance elements being spirally coiled.

3. An electrical steam sprayer comprising a reservoir, a feed tube having an open lower end extending into said reservoir, a cap on said reservoir, said feed tube being suspended from said cap, a heating unit secured to said cap, a passage in said cap communicating said tube with said heating unit, said heating unit having a steam delivery end, a flexible outer container secured to said cap, a conduit communicating said feed tube with said container, said cap having an opening communicating said reservoir with the atmosphere.

4. An electrical steam sprayer comprising a reservoir, a feed tube having an open lower end extending into said reservoir, a cap on said reservoir, said feed tube being suspended from said cap, a heating unit secured to said cap, a passage in said cap communicating said tube with said heating unit, said heating unit having a steam delivery end, and means secured to said cap including a flexible blister pumper for forcing fluid from said reservoir out of said tube.

5. An electrical steam sprayer comprising a reservoir, a feed tube having an open lower end extending into said reservoir, a cap on said reservoir, said feed tube being suspended from said cap, a heating unit secured to said cap, a passage in said cap communicating said tube with said heating unit, said heating unit having a steam delivery end, said heating unit comprising a pair of spaced electrical resistance elements, and means connecting said elements to a source of electrical current, said resistance elements being spirally coiled, a flexible outer container secured to said cap, a conduit communicating said feed tube with said container, said cap having an opening communicating said reservoir with the atmosphere.

6. An electrical steam sprayer comprising a reservoir, a feed tube having an open lower end extending into said reservoir, a cap on said reservoir, said feed tube being suspended from said cap, a heating unit secured to said cap, a passage in said cap communicating said tube with said heating unit, said heating unit having a steam delivery end, a flexible outer container secured to said cap, a conduit communicating said feed tube with said container, said cap having an opening communicating said reservoir with the atmosphere, an auxiliary reservoir, and means connecting said auxiliary reservoir with said first recited reservoir to discharge fluid from said auxiliary reservoir in alignment with said end of said heating unit when said flexible outer container is squeezed.

References Cited in the file of this patent

UNITED STATES PATENTS

| | | |
|---|---|---|
| 1,937,294 | Post | Nov. 28, 1933 |
| 1,944,108 | Robinson | Jan. 16, 1934 |
| 2,109,900 | Cohen | Mar. 1, 1938 |
| 2,137,876 | Hudson | Nov. 22, 1938 |
| 2,281,819 | Atkinson | May 5, 1942 |